(12) United States Patent
Lykken et al.

(10) Patent No.: US 6,206,120 B1
(45) Date of Patent: Mar. 27, 2001

(54) WORK VEHICLE WINDSHIELD

(75) Inventors: Thomas G. Lykken, Fargo; Todd R. Glass, Bismarck, both of ND (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/290,337

(22) Filed: Apr. 12, 1999

(51) Int. Cl.$^7$ .................................................... B62D 33/06

(52) U.S. Cl. ........................................ 180/89.12; 280/779

(58) Field of Search ................................ 180/89.1, 89.12; 280/771, 779; 296/132, 39.3

(56) References Cited

U.S. PATENT DOCUMENTS

| 3,656,799 | * | 4/1972 | Malm et al. | 296/35.1 |
| 4,781,260 | * | 11/1988 | Morita et al. | 180/89.12 |
| 4,895,391 | * | 1/1990 | Groat | 280/779 |

\* cited by examiner

*Primary Examiner*—Paul N. Dickson
*Assistant Examiner*—Faye M. Fleming
(74) *Attorney, Agent, or Firm*—Foley & Lardner

(57) ABSTRACT

A front windshield for a work vehicle having a steering column includes a transparent panel formed as a single integral unitary body. The transparent panel includes an opening therethrough sized to receive the steering column of the work vehicle.

34 Claims, 3 Drawing Sheets

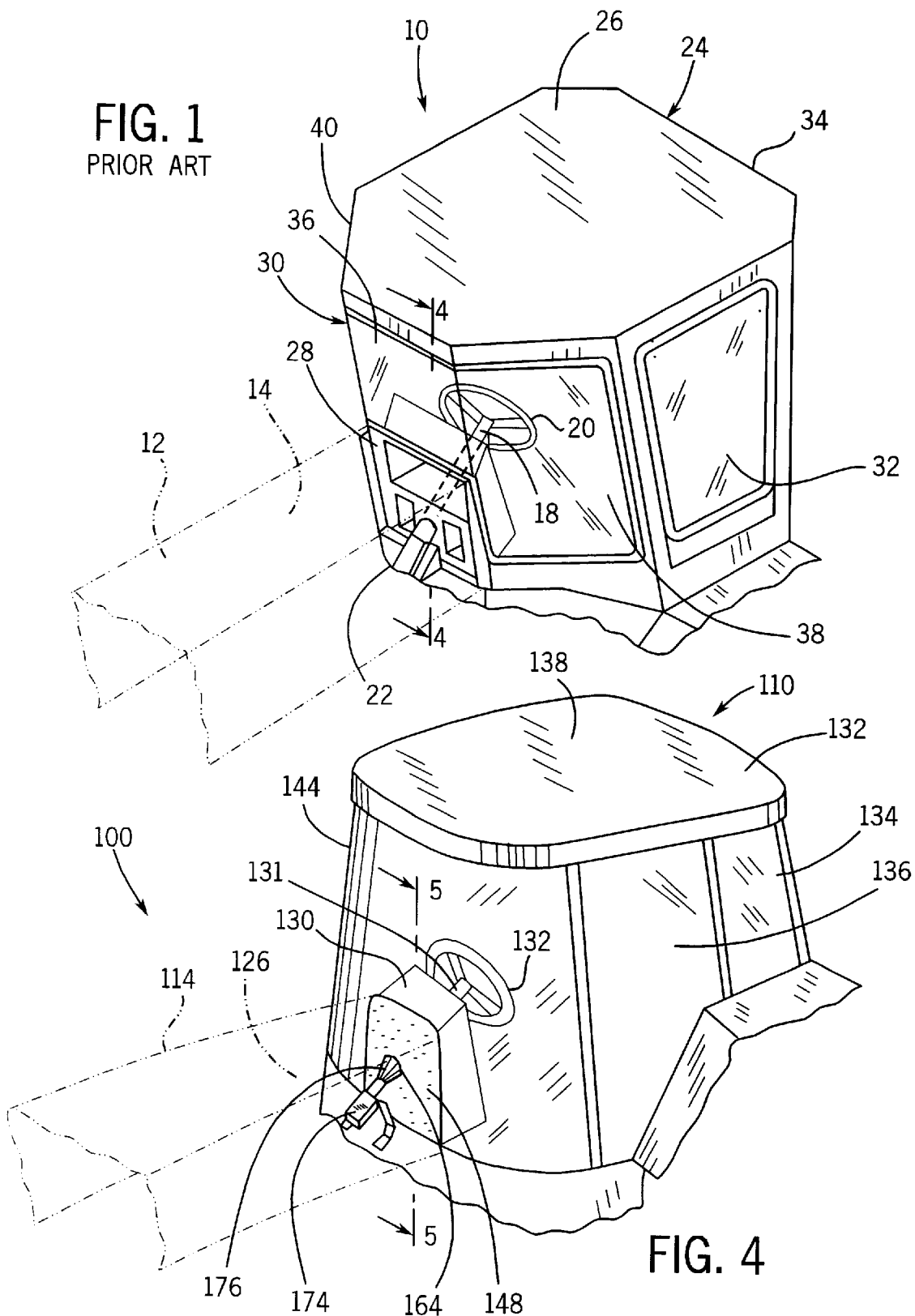

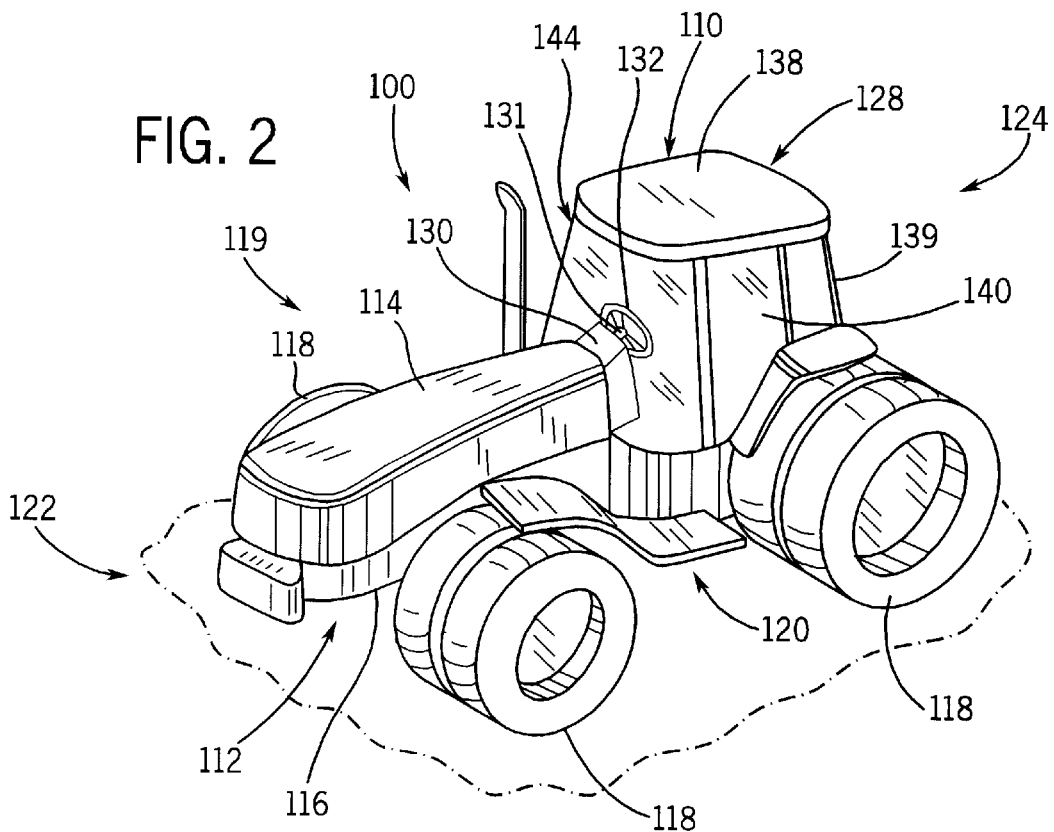

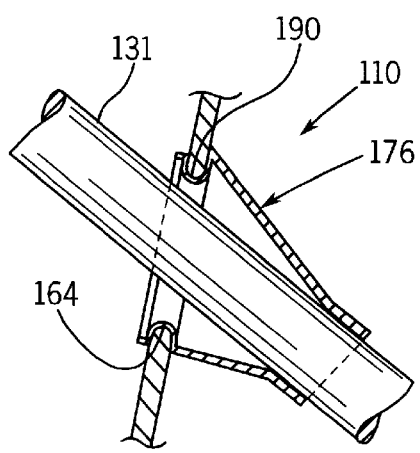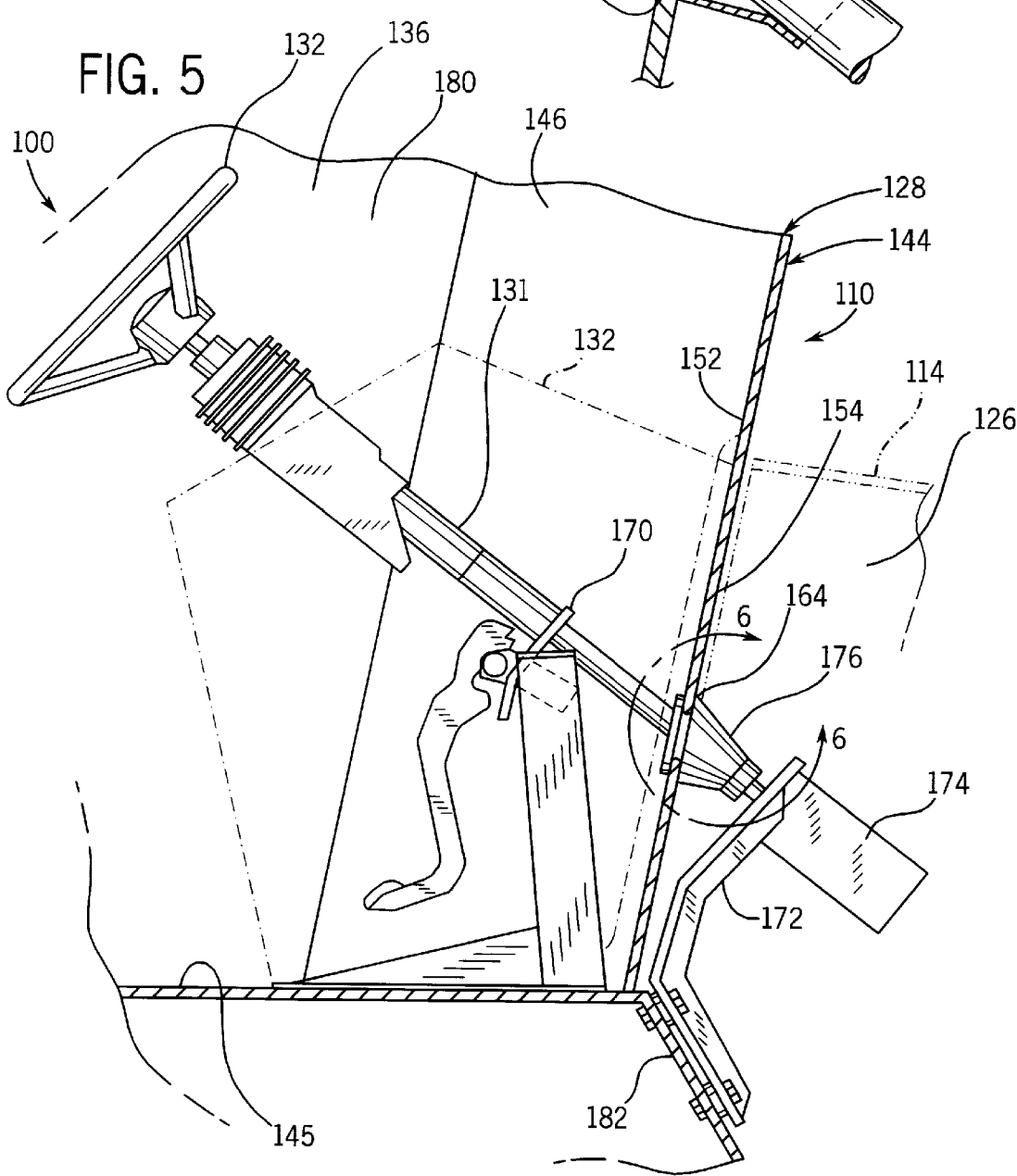

WORK VEHICLE WINDSHIELD

FIELD OF THE INVENTION

The present invention relates to work vehicle windshields. In particular, the present invention relates to work vehicle front windshields.

BACKGROUND OF THE INVENTION

Work vehicles, such as tractors and construction equipment, typically include an enclosed cab surrounding an operator station. FIG. 1 illustrates a conventionally known work vehicle operator station 10. Operator station 10 is generally located behind a hood 12 enclosing an interior 14 of a work vehicle. Operator station 10 includes steering column 18, steering wheel 20 and hand pump 22. Operator station 10 further includes a cab enclosure 24 including roof 26, front windshield 30, firewall 28, side panels 32 and a rear panel 34. Fire wall 28 comprises a metal panel supporting steering column 18 which extends through fires wall 28. Front windshield 30 comprises three vertical glass panels, front panel 31 and angled panels 38, 40, sealed to one another about fire wall 28. Panels 36, 38 and 40 are sealed between roof 26 and the floor of operator station 10.

Side panels 32 extend rearwardly from angled panels 38, 40 towards rear panel 34. Rear panel 34 extends along a rear end of operator station 10. At least one of side panels 32 is typically formed as part of a door for entering an interior of cabin enclosure 24. Side panels 32 and rear panels 34 are also sealed to one another between roof 26 and the floor by silicon caulk. Fire wall 28 and glass panels 32, 34, 36, 38 and 40 collectively form an enclosure about steering wheel 20 and an operator seat (not shown).

Current MAGNUM two-wheel drive tractors sold by Case Corporation also utilize three panels of glass about fire wall 28 to form a front windshield. However, such current MAGNUM two-wheel drive tractors have a slightly different configuration. With such tractors, front panel 36 extends across the entire top of the cab and two smaller lower side panels extend along opposite sides of fire wall 28. As a result, the seams between the glass panels are horizontal rather than vertical.

Current MU-7 tractors sold by Case Corporation utilize a one-piece front windshield. However, the one-piece windshield includes an exaggerated vertical cut-out which receives and extends about fire wall 28.

The above-described current front windshield designs have several drawbacks. First, the individual glass panels or the single glass panel must be precisely cut with minimal allowed tolerances to enable the front windshield to fit about fire wall 28. Second, such front windshields are extremely difficult to assemble because each junction between adjacent glass panels and between the glass panels and fire wall 28 must be sealed. Third, such glass panels are difficult to manufacture and have poor durability. Since most glass breakage starts at defects or high stress points at the edge of the glass and since the glass panels forming the front windshield have edges with a relatively long linear length, the glass panels forming the front windshield are more susceptible to cracking and breaking due to stresses on the glass during manufacturing, handling, shipping, installation and operation. Moreover, any inside cut, such as required to form the cut-out receiving fire wall 28 increases the chance of breakage. This problem is even further exasperated when the glass is tempered to increase strength or to shape the glass.

As a result, there is a continuing need for a work vehicle, a cab enclosure and an operator station including a front windshield which has few parts, which can be easily and inexpensively manufactured without high tolerances, which is less susceptible to crackage or breakage during manufacturing, handling, shipping, installation and operation, and which conveniently, economically and reliably provides a sealed enclosure.

SUMMARY OF THE INVENTION

According to one embodiment, the present invention provides an operator station for a work vehicle. The operator station includes a steering column, a steering control coupled to the steering column and a transparent panel. The transparent panel includes a continuously bound opening therethrough which receives the steering column.

According to a second embodiment, the present invention provides a cab for use with a work vehicle including an operator station having a floor and a steering column supporting a steering control. The cab enclosure includes a roof configured to extend opposite the floor and at least one transparent panel extending from the roof towards the floor. The at least one transparent panel includes a continuously bound opening therethrough located and sized to receive the steering column.

According to a third embodiment, the present invention provides a front windshield for a work vehicle having a steering column. The front windshield includes a transparent panel formed as a single unitary body and including an opening therethrough sized to receive the steering column of the work vehicle.

According to a fourth embodiment, the present invention provides a work vehicle including a chassis and an operator station supported by the chassis. The chassis includes a frame and a plurality of ground engaging motive members. The operator station includes a steering column, a steering control coupled to the steering column and a transparent panel supported by the chassis. The transparent panel is integrally formed as a single unitary body and provides a continuously bound opening through which the steering column extends.

BRIEF DESCRIPTION OF THE DRAWINGS

FIG. 1 is a fragmentary perspective view of a conventionally known operator station of a work vehicle.

FIG. 2 is a perspective view of a work vehicle including an exemplary operator station of the present invention.

FIG. 3 is a rear elevational view of a windshield of the operator station of FIG. 2.

FIG. 4 is an enlarged fragmentary perspective view of the work vehicle of FIG. 2 with portions shown in phantom for purposes of illustration.

FIG. 5 is a sectional view of the work vehicle of FIG. 4 taken along lines 5—5.

FIG. 6 is a sectional view of the work vehicle of FIG. 5 taken along lines 6—6.

DETAILED DESCRIPTION OF THE PREFERRED EMBODIMENTS

FIG. 2 illustrates work vehicle 100 including operator station 110. In the exemplary embodiment, work vehicle 100 comprises a wheeled tractor including chassis 112 and hood 114 in addition to operator station 110. Chassis 112 is conventionally known and includes an underlying frame 116 and ground engaging motive members 118. Frame 116 supports a conventionally known engine, transmission, hydraulic system and various other conventionally components of work vehicle 100. Ground engaging motive members 118 extend on opposite sides 119, 120 of work vehicle 100 and movably support frame 116 and work vehicle 100 above the ground. Although ground engaging motive members 118 are illustrated as wheels, ground engaging motive members 118 may alternatively comprise tracks or other ground engaging members.

Hood 114 extends from front end 122 towards rear end 124 of work vehicle 100 terminating adjacent to operator station 110. Hood 114 at least partially encloses an interior portion 126 (shown in FIG. 4) which receives the engine and other components of work vehicle 100.

Operator station 110 generally extends between hood 114 and rear end 124 of work vehicle 100. Operator station 110 generally includes cab enclosure 128, console 130, steering shaft or column 131, steering wheel 132 and an operator seat (not shown) behind steering wheel. Cab enclosure 128 extends behind and adjacent to hood 114 at rear end 124 of work vehicle 100. Cab enclosure 128 generally includes roof 138, rear transparent panel 139, side transparent panels 140, and front windshield 144. Roof 138 extends opposite a floor 145 (shown in FIG. 5) of operator station 110 and is generally coupled to each of panels 139 and 140, as well as windshield 144.

Rear transparent panel 139 extends at rear end 124 of work vehicle 100 and curves forwardly until meeting side transparent panels 140. Panels 140 extend from rear panel 139 to windshield 144. One of side panels 140 is preferably formed as part of a door for entering an interior of cab enclosure 128.

Windshield 144 extends between sides 119 and 120 and between panels 136 and 138 at a forward end of cab enclosure 128. Front windshield 144 includes an opening 164 (shown in FIG. 3) therethrough, through which steering column 131 extends and is coupled to steering components of work vehicle 100. Overall, roof 130, rear panel 139, side panels 136 and windshield 144 cooperate to enclose console 132, steering column 131, steering wheel 136 and the operator seat of operator station 110.

FIGS. 3 and 4 illustrate windshield 144 in greater detail. As best shown by FIG. 3, windshield 144 generally includes front panel 146, coating 147 and layer 148. Front panel 146 comprises an elongate generally rectangular panel of transparent material having rear face 152, front face 154 (shown in FIG. 5), edges 156, 158, 160, 162 and opening 164. Face 152 is configured to face rear end 124 of work vehicle 100 while face 154 is configured to face front end 122 when mounted to work vehicle 100 to form cab enclosure 128. Edges 160 axed 162 extend adjacent to roof 138 and floor 142 of cab enclosure 128, respectively. Edges 156 and 158 are configured to extend adjacent to side panel 140. Opening 164 extends through front panel 146 and is continuously bound or bordered by panel 146. Opening 164 is preferably located along the transverse center line 166 of front panel 146 and is sized to receive steering column 131 of work vehicle 10). In the exemplary embodiment, front panel 146 is formed from a tempered glass capable of transmitting at least 70 percent light. Panel 146 preferably has a thickness of approximately 6 millimeters. In the exemplary embodiment, opening 164 is preferably circular in shape and has a diameter of approximately 83 millimeters.

As further shown by FIG. 4, panel 146 is preferably bowed so as to provide a concavity facing rear end 124 of work vehicle 100. In the exemplary embodiment, panel 146 has a radius of approximately 2500 millimeters along axis 166. Panel 146 has a radius of approximately 550 millimeters along vertical axes 168 and a radius of approximately 900 millimeters proximate edges 156 and 158. Because panel 146 is bowed, panel 146 eliminates the need for angled panels 38, 40 as well as the seams between front panel 34 and angled panels 38, 40 (shown in FIG. 1). Consequently, front panel 146 enables windshield 144 to be formed as a single unitary panel, thereby reducing the number of parts, reducing assembly time and costs and improving the aesthetic appearance of the work vehicle. work vehicle. Moreover, panel 146 enables windshield 144 to provide the user with improved visibility. As will be appreciated, the exact curvature of front panel 46 and windshield 144 may be varied depending upon the desired configuration of operator station 110 and cab enclosure 128. Although less desirable, panel 146 may alternatively be flat or planar.

Coating 147 is a layer of substantially opaque material supported by face 152 of front panel 146. Coating 147 extends along edges 156, 158, 160 and 162 and about opening 164. As best shown by FIG. 4, coating 148 extends about opening 164 in regions adjacent to interior portion 126. Because coating 147 is substantially opaque, coating 147 prevents light from passing through windshield 144 along edges 156, 158, 160 and 162. In addition, coating 147 also prevents light from passing through front panel 146 forward of console 130 which would otherwise undesirably light up console 130. In the exemplary embodiment, coating 147 comprises a black ceramic deposited in a conventionally known manner upon face 152 of front panel 146. As will be appreciated, various other alternative opaque materials may be employed.

Layer 148 has a layer of heat resistant, and preferably noise resistant material deposited upon or otherwise affixed to coating 147 about opening 164. Layer 148 extends between front panel 146 and interior portion 126. Layer 148 thermally and acoustically insulates front panel 146 from the heat and the noise generated within interior portion 126. In the exemplary embodiment, layer 148 comprises a layer of foam such as polyetherurethane.

FIGS. 5 and 6 illustrate operator station 110 in greater detail. FIG. 5 is a fragmentary sectional view of operator station 110 taken along lines 5—5 of FIG. 4. As best shown by FIG. 5, operator station 110 additionally includes support brackets 170, 172, steering pump 174 and seal 176. Support bracket 170 extends upward from floor 142 and supports steering column 131 within interior 180 of operator station 110. Bracket support 172 is secured to frame 182 of work vehicle 100 and is configured to support steering column 131 and steering pump 174 in connection with one another within interior portion 126 of hood 114. As will be appreciated, support brackets 170 and 172 may have a variety of alternative configurations for supporting steering column 131. Moreover, support brackets 170 and 172 may be alternatively integrally formed as part of frame 182, floor 142 or console 132.

Steering pump 174 is conventionally known and is secured to steering column 131 to steering pump 174 which facilitates steering of work vehicle 100 in a conventionally known manner. Alternatively, steering column 131 may be connected to a mechanical linkage which enables work vehicle 100 to be steered in a conventionally known manner.

Seal 176 extends between steering column 131 and front windshield 144 to seal opening 164 about column 131. Seal 176 seals opening 164 about steering column 131 to prevent dirt, dust, particles, heat and smell from entering interior 180 of cab enclosure 128 through opening 164. In the exemplary embodiment, seal 176 also enables steering column 131 to be rotated by steering control 136. As shown by FIG. 6, seal 176 preferably comprises the flexible tubular boot or sleeve which is secured to the perimeter of panel 146 extending about opening 164 and tapers to an outer circumferential surface of column 131. Seal 176 is preferably conical in shape and includes a circumferentially extending groove 190 configured to receive the perimeter of panel 146 about opening 164. Seal 176 tapers away from groove 190 about steering column 131 in close proximity with steering column 131.

Front windshield 144 provides a one-piece windshield which is easily and inexpensively manufactured with high tolerances, with is less susceptible to crackage or breaking during manufacturing, handling, shipping, installation and operation and which can conveniently, economically and reliably assist in providing a sealed enclosure for cab enclosure 128. Because front windshield 144 comprises a single piece, front windshield 144 has fewer parts and an overall shorter perimeter edge such that windshield 144 is less susceptible to crackage or breakage. Because front windshield 144 is preferably bowed, front windshield 144 provides an operator with better visibility towards front end 122 of work vehicle 110 as well as towards sides 119 and 120 without vision obstructing seams. Because front windshield 144 eliminates the previously required fire wall 28, the cost and complexity of operator station 110 is reduced. Because front windshield 144 is no longer required to be attached or sealed to fire wall 28, windshield 144 can be manufactured with greater tolerances, thereby reducing cost. Most importantly, because front windshield 144, and in particular, because front panel 146 includes opening 164 which is continuously bounded, windshield 144 and panel 146 eliminate the need for an inside cut which would otherwise increase the possibility of cracking or breaking of windshield 144. Because opening 164 has an edge with, a reduced linear length as compared to a previously required large cut-out necessary to receive fire wall 28, windshield 144 has a decreased edge length which increases glass reliability. Because opening 164 is preferably circular and preferably has a maximum diameter of approximately 83 millimeters, the perimeter of opening 164 is less susceptible to cracking or breaking. As a result, front panel 146 of windshield 144 may be more easily tempered and shaped without cracking or breakage occurring during cooling of front panel 146 or during the mounting of front panel 146. Consequently, front windshield 144 may be substantially bowed to provide the operator with better visibility. Because windshield 144 enables steering shaft 134 to extend through windshield 144 in line with steering hand pump 170, extensive and complex U-joints otherwise necessary to support steering column 131 through the floor are eliminated. Moreover, because steering column 131 extends through windshield 144, steering column 131 and steering column 136 may be positioned at an optimum ergonomic location for the operator and does not occupy valuable space within the interior of cab enclosure 128.

Although operator station 110, cab enclosure 128 and front panel 146 of front windshield 144 are illustrated in FIGS. 1–6 as part of a work vehicle 100 comprising a tractor, each of operator station 110, cab enclosure 128 and front panel 146 may be employed on a wide variety of alternative work vehicles including a front windshield or a cab enclosure. For example, front panel 146 or cab enclosure 128 may alternatively be employed in other agricultural work vehicles such as combines or in various construction equipment. Furthermore, as will be appreciated, the shape of front panel 146 may be varied depending upon the particular work vehicle and cab enclosure in which front panel 146 is employed Moreover, as will be appreciated, coating 147 and layer 148 may be further omitted or modified depending upon the particular work vehicle or cab enclosure in which front windshield 144 is employed. For example, in vehicles not including the hood or interior portion forward of windshield 144, windshield 144 may omit panel 146 and layer 148 about opening 164.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. An operator station for a work vehicle, the station comprising:
   a steering column;
   a steering control coupled to the steering column; and
   a panel having formed therein a continuously bound opening, wherein the opening receives the steering column, at least a portion of the panel being transparent.

2. The station of claim 1 including a first support supporting the column on a first side of the panel.

3. The station of claim 2 including a second support supporting the column on a second side of the panel.

4. The station of claim 1 including a seal between the column and the panel.

5. The station of claim 4 wherein the seal includes a flexible tubular sleeve about the column and sealed against the panel.

6. The station of claim 1 wherein the opening is circular.

7. The station of claim 1 including a heat resistant wall proximate the opening.

8. The station of claim 7 wherein the wall is on a side of the panel facing the steering control.

9. The station of claim 7 wherein the wall comprises a layer of heat resistant material deposited on the panel.

10. The station of claim 7 wherein the wall includes polyetherurethane.

11. The station of claim 7 wherein the wall is noise resistant.

12. The station of claim 1 including a hand pump coupled to the steering column on a side of the panel facing away from the steering control.

13. The station of claim 1 further including a floor and a roof opposite the floor, wherein the panel extends from the floor to the roof.

14. The station of claim 13 including at least one additional panel extending from the transparent panel between the floor and the roof.

15. The station of claim 14 wherein the at least one additional panel is transparent.

16. The station of claim 1 wherein the transparent panel includes a layer of opaque material about the opening.

17. The station of claim 16 wherein the opaque material comprises a ceramic material.

18. The station of claim 1 wherein the transparent panel is bowed.

19. The station of claim 1 wherein the transparent panel is integrally formed as a single unitary body.

20. The station of claim 19 wherein the transparent panel is formed from tempered glass.

21. The station of claim 20 wherein the transparent panel is bowed.

22. The station of claim 21 wherein the opening is circular and has a maximum diameter of approximately 83 millimeters.

23. A cab enclosure for use with a work vehicle including an operator station having a floor and a steering column supporting a steering control, the cab enclosure comprising:

a roof configured to extend opposite the floor; and at least one panel extending from the roof towards the floor, the at least one panel having formed therein a continuously bound opening located and sized to receive the steering column, at least a portion of the panel being transparent.

24. The cab enclosure of claim 23 wherein the front transparent panel is formed from tempered glass.

25. The cab enclosure of claim 24 wherein the front transparent panel is bowed.

26. The cab enclosure of claim 25 wherein the continuously bound opening is circular.

27. A work vehicle comprising:

a chassis including a frame and a plurality of ground engaging motive members; and an operator station supported by the chassis, the operator station including:

a steering column;

a steering control coupled to the steering column; and a panel supported by the chassis, the panel being integrally formed as a single unitary body and having formed therein a continuously bound opening through which the steering column extends, at least a portion of the panel being transparent.

28. The work vehicle of claim 27 wherein the transparent panel is formed from tempered glass.

29. The work vehicle of claim 28 wherein the transparent panel is bowed.

30. The work vehicle of claim 29 wherein the continuously bound opening is circular.

31. The work vehicle of claim 27 wherein the transparent panel is bowed.

32. The work vehicle of claim 27 including a seal between the column and the transparent panel.

33. The work vehicle of claim 27 wherein the seal comprises a flexible tubular sleeve about the column and sealed against the transparent panel.

34. A front windshield for a work vehicle having a steering column, the front windshield comprising:

a panel formed as a single integral unitary body and having formed therein an opening sized to receive the steering column of the work vehicle, at least a portion of the panel being transparent.

* * * * *